United States Patent
Gan et al.

(10) Patent No.: US 6,775,144 B2
(45) Date of Patent: Aug. 10, 2004

(54) COMPUTER ENCLOSURE WITH FASTENER

(75) Inventors: Li-Yuan Gan, Shenzhen (CN); Guang-Yi Zhang, Shenzhen (CN)

(73) Assignee: Hon Hai Precison Ind. Co., Ltd., Taipei Hsien (TW)

( * ) Notice: Subject to any disclaimer, the term of this patent is extended or adjusted under 35 U.S.C. 154(b) by 51 days.

(21) Appl. No.: 10/305,702

(22) Filed: Nov. 27, 2002

(65) Prior Publication Data

US 2004/0037047 A1 Feb. 26, 2004

(30) Foreign Application Priority Data

Aug. 23, 2002 (TW) ...................................... 91213119 U

(51) Int. Cl.[7] .................................................. G06F 1/16
(52) U.S. Cl. ........................ 361/727; 361/724; 361/683; 312/223.1; 312/223.2
(58) Field of Search ................................ 361/724, 725, 361/727, 683; 312/223.1, 223.2

(56) References Cited

U.S. PATENT DOCUMENTS

| | | | |
|---|---|---|---|
| 5,751,545 A | * 5/1998 | Jung | 361/683 |
| 6,231,144 B1 | * 5/2001 | Chen et al. | 312/332.1 |
| 6,373,692 B1 | * 4/2002 | Cheng | 361/683 |
| 6,398,325 B1 | * 6/2002 | Chen et al. | 312/223.2 |
| 6,407,912 B1 | * 6/2002 | Chen et al. | 361/683 |
| 6,542,356 B2 | * 4/2003 | Gan | 361/683 |

* cited by examiner

Primary Examiner—Darren Schuberg
Assistant Examiner—Anthony Q. Edwards
(74) Attorney, Agent, or Firm—Wei Te Chung

(57) ABSTRACT

A computer enclosure includes a hood (10), a chassis (30) with a frame (40) mounted therein, and a fastener (60) securing the hood on the chassis. The hood has aligned hooks (12). The frame defines aligned first slits (422). The fastener includes a sliding plate (62) slidably attached on the frame, a pivot plate (64) pivotably attached on the frame, a handle (66) pivotably attached to the hood, and a spring (68). The sliding plate defines aligned second slits (624), and a transverse slot (627) movably receiving a protrusion (644) of the pivot plate therein. The hooks are extended through the first and second slits to snappingly engage with the sliding plate in the second slits. When the handle is pressed down, it rotates the pivot plate, and the protrusion of the pivot plate pushes the sliding plate to a position where the hood is easily removed.

19 Claims, 5 Drawing Sheets

US 6,775,144 B2

COMPUTER ENCLOSURE WITH FASTENER

BACKGROUND OF THE INVENTION

1. Field of the Invention

The present invention relates to a computer enclosure, and particularly to a computer enclosure having a hood and a chassis, the hood being readily attached to and detached from the chassis by means of a fastener.

2. Related Art

A conventional computer enclosure generally includes a chassis, a hood and a bezel. The chassis is used to hold components such as motherboards, interface cards, a power supply and disk drives. The chassis is generally U-shaped, and comprises a base, a front panel and a rear panel. The hood is also generally U-shaped, and comprises a top panel and two opposite side panels depending from the top panel. The hood is slidingly attached to the chassis along rails formed on opposite sides of the chassis, and then secured to the rear panel with screws. Finally, the bezel is mounted on the front panel.

Securing the hood to the rear panel with screws is unduly complicated and time-consuming. Furthermore, it is difficult to simultaneously align respective side edges of the hood with the rails of the chassis.

Another kind of conventional hood is secured to a chassis by means of engagement of locking catches of the hood in slots of the chassis. However, disengaging this kind of hood from the chassis is unduly complicated and laborious.

SUMMARY OF THE INVENTION

Accordingly, an object of the present invention is to provide a computer enclosure which has a fastener for readily mounting a hood to a chassis of the enclosure and readily removing the hood therefrom.

To achieve the above-mentioned object, a computer enclosure in accordance with the present invention comprises a hood, a chassis with a frame mounted therein, and a fastener securing the hood on the chassis. The hood has a plurality of hooks. The frame defines a plurality of aligned first slits. The fastener includes a sliding plate slidably attached on the frame, a pivot plate pivotably attached on the frame between the frame and the sliding plate, a handle pivotably attached to the hood, and a spring connected between the sliding plate and the frame. The sliding plate defines a plurality of aligned second slits and a transverse slot. The pivot plate forms a protrusion movably received in the transverse slot. The hooks are extended through the first and second slits to snappingly engage with the sliding plate in the second slits. When the handle is pressed down, it rotates the pivot plate, and the protrusion of the pivot plate pushes the sliding plate to a position where the second slits are fully aligned with the hooks. The hood is then easily lifted up from and off of the chassis.

Other objects, advantages and novel features of the present invention will be drawn from the following detailed description of a preferred embodiment of the present invention with reference to the attached drawings, in which:

DESCRIPTION OF THE PREFERRED EMBODIMENT

Figure 1:
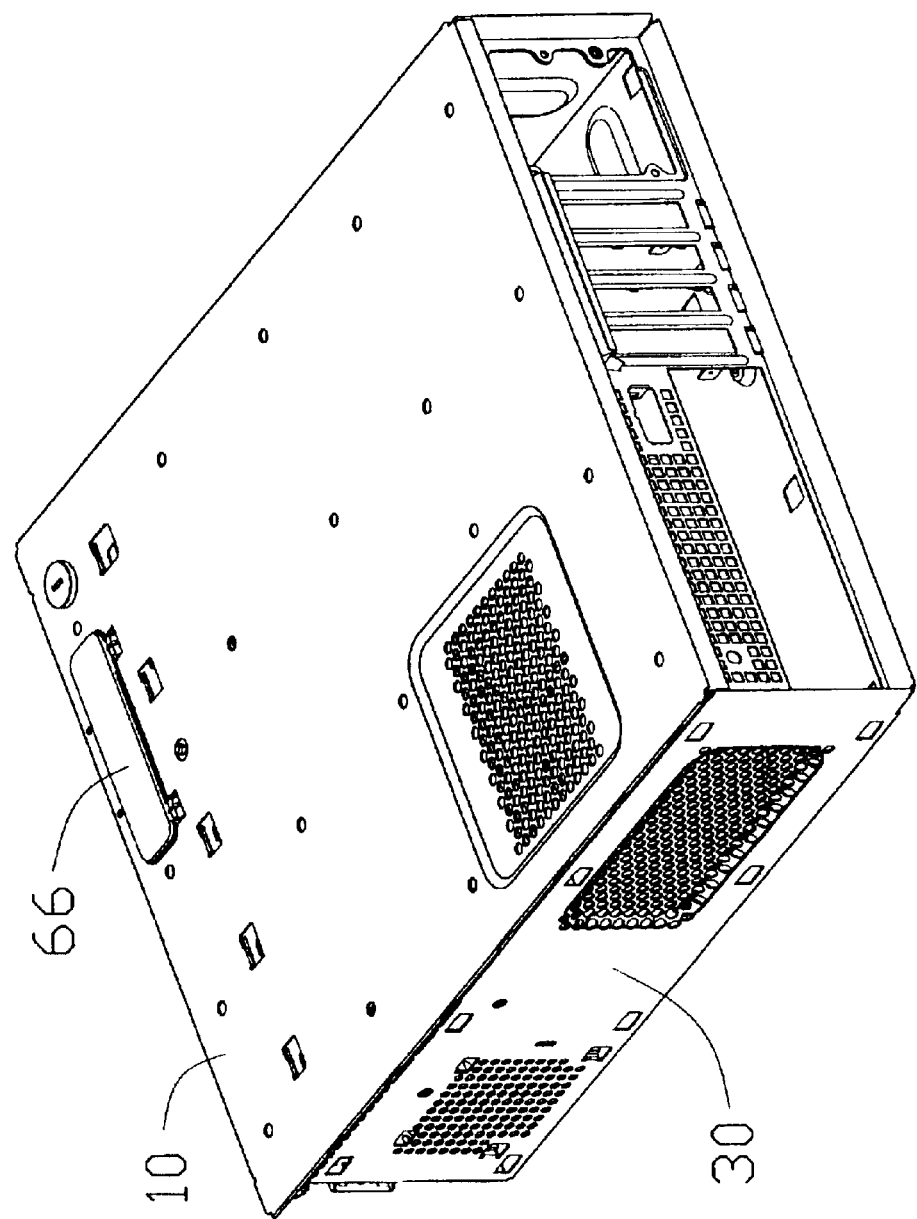
FIG. 1 is an assembled isometric view of a computer enclosure in accordance with the present invention.
Figure 2:
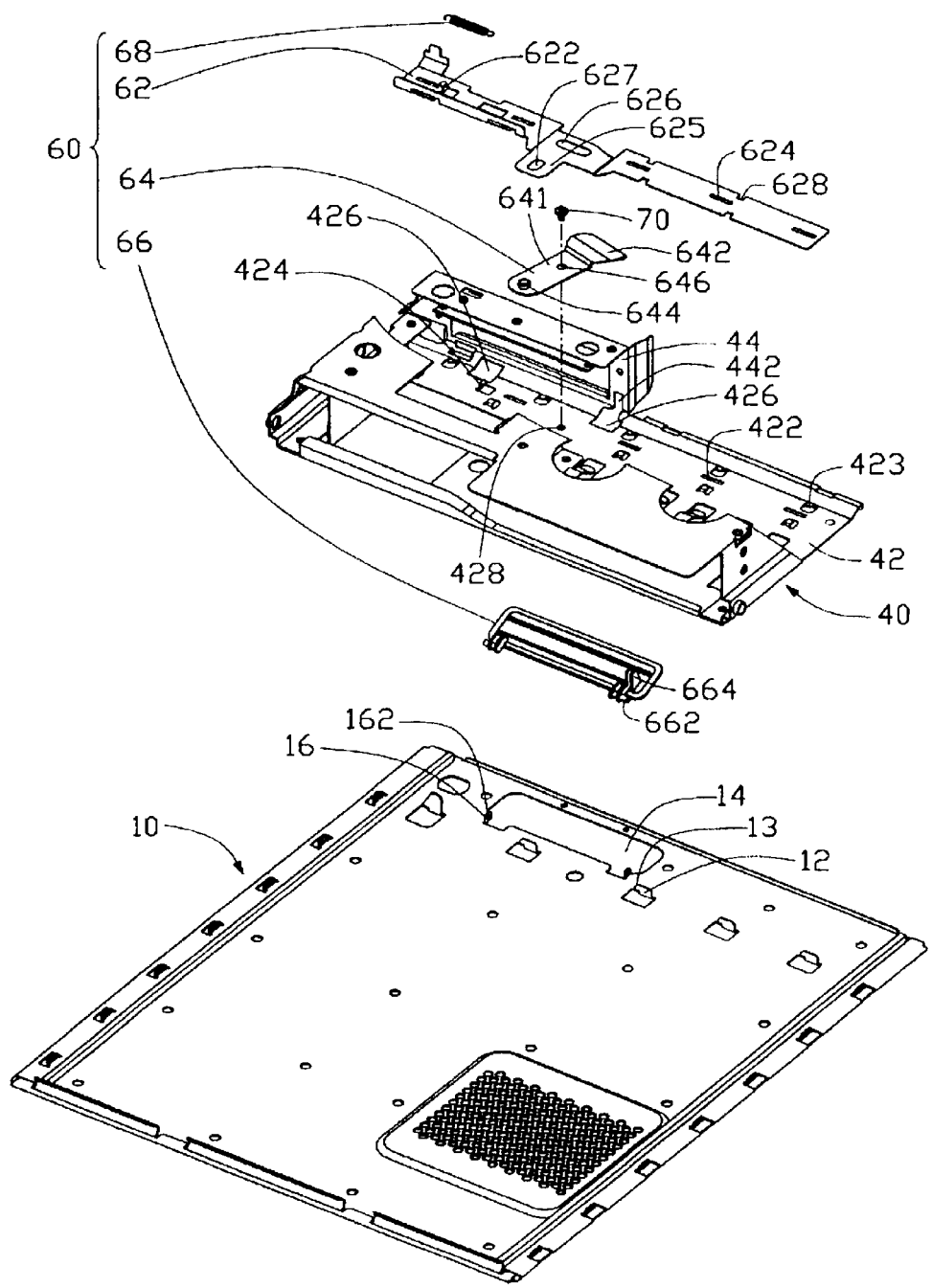
FIG. 2 is an exploded, inverted view of a hood, a frame and a fastener of the computer enclosure of FIG. 1, with part of the frame cut away for better illustration.

Referring to FIGS. 1 and 2, a computer enclosure in accordance with the present invention comprises a hood 10, a chassis 30, a storage device frame 40 secured in the chassis 30, and a fastener 60 for attaching the hood 10 to the storage device frame 40.

The hood 10 has a plurality of aligned latches 12 formed on a rear portion of an inside thereof. In the preferred embodiment, each latch 12 is a generally L-shaped hook 12, and has a sloped edge 13 defined at a free end thereof. A rectangular opening 14 is defined in the hood 10 between the aligned hooks 12 and a rear edge of the hood 10. A pair of tabs 16 extends inwardly from the hood 10 at opposite sides of the opening 14 respectively. Each tab 16 defines a pivot hole 162 therein.

Figure 3:
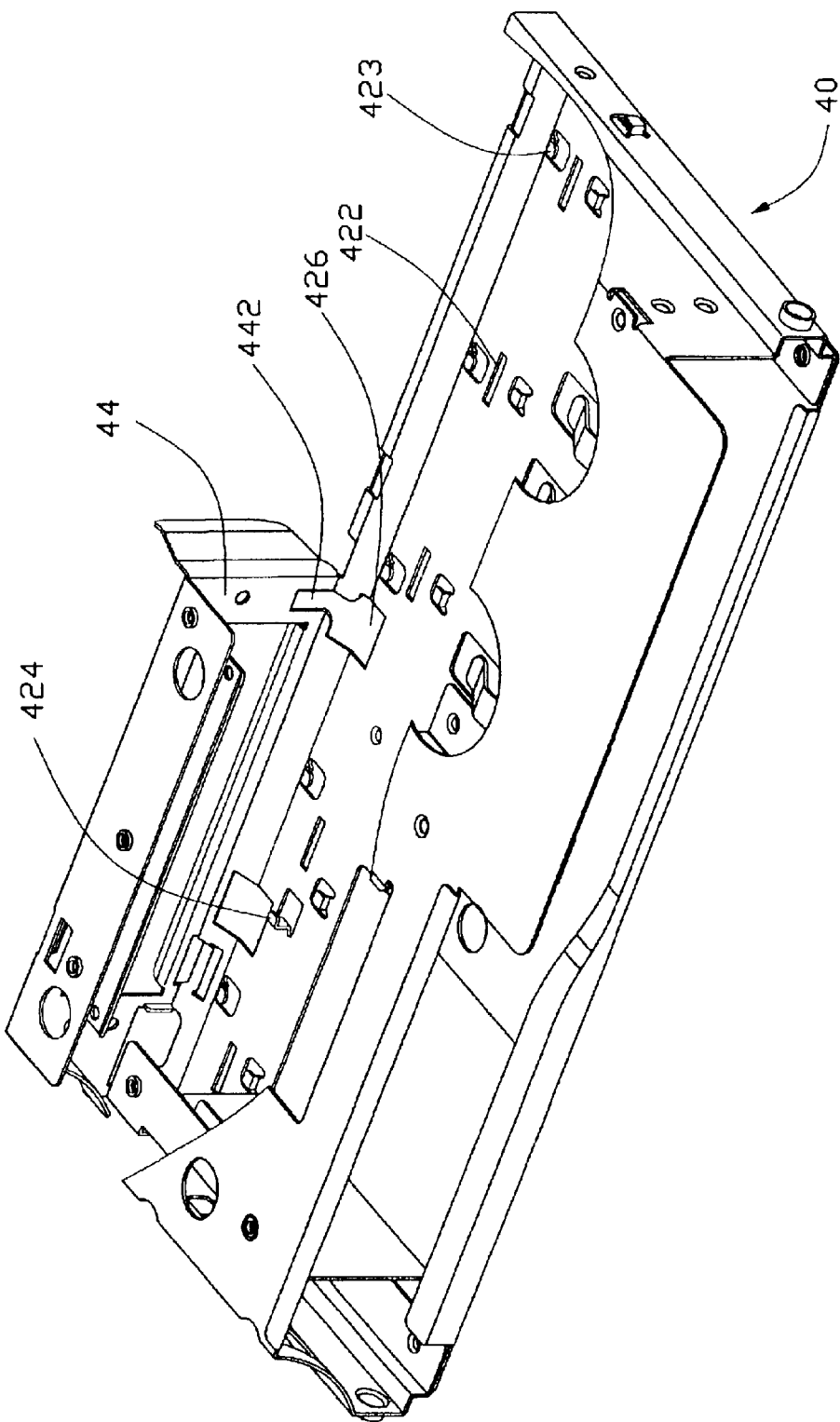
FIG. 3 is an enlarged view of the frame of FIG. 2.

Referring to FIG. 3, the storage device frame 40 comprises a horizontal panel 42, and a vertical panel 44 extending perpendicularly from a right portion of a rear edge of the horizontal panel 42. A plurality of aligned first slits 422 is defined in the horizontal panel 42, corresponding to the hooks 12 of the hood 10. Two rows of clasps 423 are formed on the horizontal panel 42, parallel to and on respective opposite sides of the first slits 422. A first catch 424 is formed on the horizontal panel 42 near the vertical panel 44. A pair of spaced first cutouts 426 is defined in the horizontal panel 42 adjacent the vertical panel 44. A second cutout 442 is defined in the vertical panel 44, in communication with one of the first cutouts 426 that is nearest a middle of the horizontal panel 42. A screw hole 428 is defined in the horizontal panel 42 proximate the first cutout 426 that is nearest the middle of the horizontal panel 42.

As shown in FIG. 2, the fastener 60 comprises an elongate sliding plate 62, a pivot plate 64, a handle 66 and a coil spring 68. A plurality of aligned second slits 624 is defined along a length of the sliding plate 62, corresponding to the first slits 422 of the storage device frame 40. A second catch 622 is formed near an end of the sliding plate 62. An extension tab 625 extends generally coplanarly and perpendicularly from approximately a middle portion of the sliding plate 62. A longitudinal slot 626 is defined in the sliding plate 62 opposite the extension tab 625. The longitudinal slot 626 is oriented parallel to the sliding plate 62. A transverse slot 627 is defined in the extension tab 625, and is oriented perpendicular to the longitudinal slot 626. A plurality of spaced notches 628 is defined in opposite longitudinal side edges of the sliding plate 62.

The pivot plate 64 comprises a main body portion 641, and a bent portion 642 extending from the body portion 641. The bent portion 642 is generally parallel to but offset from the body portion 641. A protrusion 644 is formed on a distal end portion of the body portion 641, opposite from the bent portion 642. A through hole 646 is defined in the body portion 641 between the protrusion 644 and the bent portion 642, for extension of a screw 70 therethrough to engage in the screw hole 428 of the storage device frame 40.

The handle 66 comprises a pair of spaced pivots 662, corresponding to the pivot holes 162 of the hood 10. A pushing tab 664 is formed at one end of the handle 66, adjacent one of the pivots 662.

Figure 4:
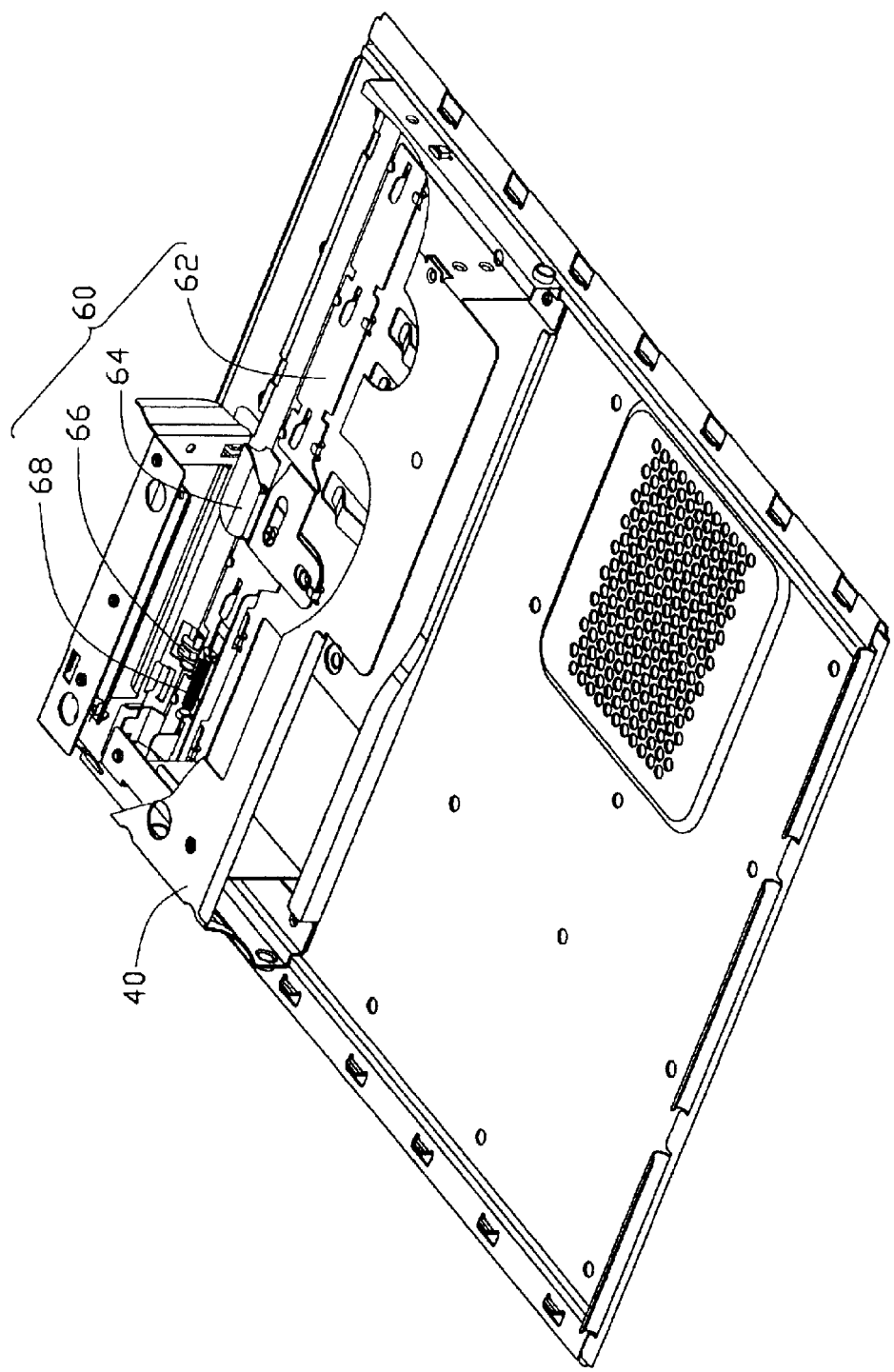
FIG. 4 is an assembled view of FIG. 2, showing the fastener in a locked position.
Figure 5:
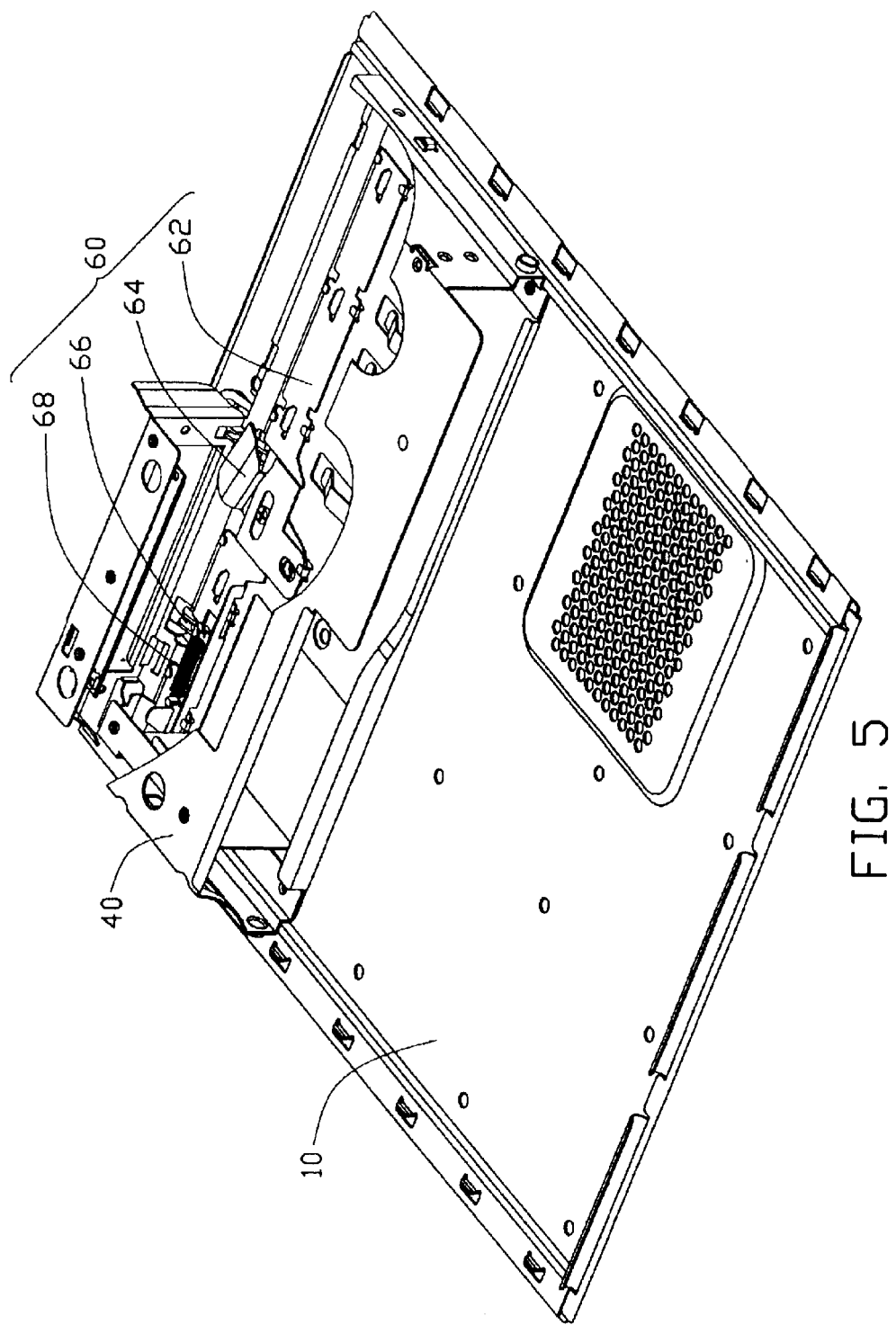
FIG. 5 is similar to FIG. 4, but showing the fastener in a releasing position.

Referring also to FIGS. 4–5, in assembly, the pivot plate 64 is attached to the sliding plate 62 at the extension tab 625, with the protrusion 644 of the pivot plate 64 being received in the transverse slot 627. The combined sliding plate 62 and pivot plate 64 is placed on the horizontal panel 42 of the storage device frame 40. The clasps 423 of the horizontal panel 42 pass through the corresponding notches 628 of the sliding plate 62. The sliding plate 62 is then slid horizontally relative to the horizontal panel 42, so that the sliding plate 62 is slidably engaged between the clasps 423. The sliding plate 62 is not movable in vertical directions. The screw 70 is extended through the longitudinal slot 626 of the sliding plate 62 and the through hole 646 of the pivot plate 64 to engage in the screw hole 428 of the horizontal panel 42. The pivot plate 64 is thereby pivotably attached to the horizontal panel 42. Opposite ends of the spring 68 are attached to the first and second catches 424, 622, respectively. The handle 66 is attached to the hood 10 in the opening 14, with the pivots 662 being pivotably received in the pivot holes 162 respectively. The combined hood 10 and handle 66 is then attached to the horizontal panel 42 of the storage device frame 40. The tabs 16 and pivots 662 are received in the corresponding first cutouts 426 of the horizontal panel 42. The pushing tab 664 is received in the second cutout 442 of the vertical panel 44. The hooks 12 extend through the corresponding first slits 422 of the horizontal panel 42 to wedge in the corresponding second slits 624 of the sliding plate 62 via the sloped edges 13. The hooks 12 push the sliding plate 62 in a rightward direction, and the spring 68 is expanded. When the hooks 12 have completely passed through the second slits 624, the spring 68 deforms back to its original shape and thereby causes the sliding plate 62 to slide back in a leftward direction. The hooks 12 are therefore snappingly engaged with the sliding plate 62 in the second slits 624. The hood 10 is thus securely attached to the chassis 30 (see FIG. 4).

In disassembly, the handle 62 is pressed downwardly. The pushing tab 664 pushes a distal edge of the bent portion 642 of the pivot plate 64 away from the vertical panel 44, thus causing the pivot plate 64 to pivot about the screw 70. The protrusion 641 pushes the sliding plate 62 in the rightward direction, and the spring 68 is expanded. When the second slits 624 become fully aligned with the corresponding hooks 12, the hood 10 is free to be released from the fastener 60 (see FIG. 5). The hood 10 is then easily lifted up from and off of the chassis 40.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
   a chassis with a frame mounted therein, the frame defining a plurality of aligned first slits therein;
   a hood attached to the chassis, the hood having a plurality of latches; and
   a fastener securing the hood on the chassis, the fastener comprising a handle pivotably attached to the hood, a sliding plate slidably attached on the frame, a pivot plate pivotably attached on the frame and connected to the sliding plate, and an elastic member connected between the sliding plate and the frame, the sliding plate defining a plurality of aligned second slits; wherein
   the latches of the hood are extendable through the first slits to wedge in the second slits and snappingly engage with the sliding plate in the second slits and thereby attach the hood to the chassis.

2. The computer enclosure as claimed in claim 1, wherein the pivot plate comprises a body portion defining a through hole, and a screw is extended through the through hole to engage in a screw hole of the frame thereby pivotably attaching the pivot plate to the frame.

3. The computer enclosure as claimed in claim 2, wherein the body portion forms a protrusion thereon, and the sliding plate defines a transverse slot receiving the protrusion therein.

4. The computer enclosure as claimed in claim 2, wherein the sliding plate defines a longitudinal slot slidably receiving the screw therein.

5. The computer enclosure as claimed in claim 2, wherein the pivot plate further comprises a bent portion connecting with the body portion, and the handle comprises a pushing tab extending through the frame to abut the bent portion, the pushing tab pushing the bent portion to cause the pivot plate to pivot about the screw when the handle is operated.

6. The computer enclosure as claimed in claim 5, wherein the frame comprises a horizontal panel and a vertical panel, the horizontal panel forms two rows of clasps movably engaging the sliding plate therebetween, and the vertical panel defines a cutout for extension of the pushing tab therethrough.

7. The computer enclosure as claimed in claim 6, wherein the sliding plate defines a plurality of notches on opposite side edges thereof, for extension of the clasps therethrough when the sliding plate is first attached to the frame.

8. The computer enclosure as claimed in claim 1, wherein each of the latches is a generally L-shaped hook, and has a sloped edge at a free end thereof.

9. The computer enclosure as claimed in claim 1, wherein the handle comprises a pair of pivots, and the hood comprises a pair of tabs each defining a pivot hole pivotably receiving a corresponding pivot therein.

10. The computer enclosure as claimed in claim 1, wherein the frame has a first catch, the sliding plate has a second catch, and the elastic member is connected between the first and second catches.

11. The computer enclosure as claimed in claim 1, wherein the elastic member is a spring.

12. A computer enclosure comprising:
    a chassis with a frame mounted therein, the frame defining a plurality of aligned first slits therein;
    a hood attached to the chassis, the hood having a plurality of latches; and
    a fastener securing the hood on the chassis, the fastener comprising a handle pivotably attached to the hood, a sliding plate slidably attached on the frame, and a pivot plate pivotably attached on the frame, the sliding plate defining a plurality of aligned second slits, the pivot plate having a pushing means, the latches being extended through the first and second slits to snappingly engage with the sliding plate in the second slits; wherein
    when the handle is pressed, it rotates the pivot plate to cause the pushing means to move the sliding plate, thereby disengaging the latches from the second slits respectively.

13. The computer enclosure as claimed in claim 12, wherein the sliding plate defines a transverse slot, and the pushing means comprises a protrusion formed on the pivot plate and movably received in the transverse slot.

14. The computer enclosure as claimed in claim 12, wherein the handle comprises a pushing tab extending through the frame, for pushing the pivot plate to rotate.

15. The computer enclosure as claimed in claim 12, wherein the fastener further comprises an elastic member connected between the sliding plate and the frame for moving the sliding plate back to its original position.

16. A computer enclosure comprising:
- a chassis with a frame mounted therein, said frame including therein a plurality of aligned first slits along a first direction;
- a hood defining a main plane and adapted to be assembled to on an outside of the frame, said hood including a plurality of aligned latches along said first direction and corresponding to said first slits, respectively;
- a fastener assembled to the frame without relative movement in a second direction perpendicular to said main plane and said first direction, while with capability of relative movement in said first direction, and including a sliding plate defining a plurality of aligned second slits along said first direction and corresponding to said first slits and latches, respectively;
- said sliding plate cooperating with said hood to sandwich the frame therebetween wherein
  - the latches extending through both the corresponding first and second slits, respectively, are latched, in said second direction, by said sliding plate when said sliding plate is in a first position, and unlatched by said sliding plate when said sliding plate is in a second position.

17. The enclosure as claimed in claim 16, further including a spring constantly urging said sliding plate to be located in the first position.

18. The enclosure as claimed in claim 16, further including a pivot plate equipped with the sliding plate to move the sliding plate from the first position to the second position.

19. The enclosure as claimed in claim 18, further including a handle to actuate said pivot plate to move.

* * * * *